UNITED STATES PATENT OFFICE.

ROBERT GNEHM, OF BASLE, SWITZERLAND, ASSIGNOR TO THE SOCIETY OF CHEMICAL INDUSTRY, OF SAME PLACE.

PRODUCTION OF A NEW ETHYL-ETHER.

SPECIFICATION forming part of Letters Patent No. 361,690, dated April 26, 1887.

Application filed June 15, 1886. Serial No. 205,259. (Specimens.)

*To all whom it may concern:*

Be it known that I, ROBERT GNEHM, a citizen of Switzerland, residing at Basle, Switzerland, have invented new and useful Improvements in the Production of the Ethyl-Ether of a New Acid by the action of Acetyl-Acetic Ether upon Ethylenediamine, of which the following is a specification.

This invention relates to the production of the ethyl-ether of a new acid by the action of acetyl-acetic ether upon ethylenediamine.

In carrying out my invention I proceed as follows: 1.5 parts, by weight, of ethylenediamine dissolved in water are mixed with five parts, by weight, of acetyl-acetic ether and heated for some time on the water-bath. On cooling, crystals are obtained, which are collected on a filter and purified by recrystallization from alcohol, yielding 3.5 parts by weight.

The following equation indicates the course of the reaction:

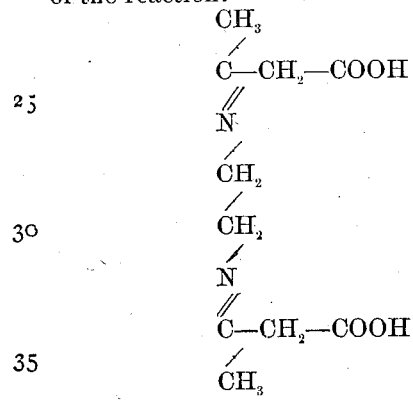

This acid has, however, not been known as yet, and all trials to produce it have up to the present time given but negative results—*i. e.*, the ethyl-ether has always been completely decomposed, wherefore it seems to be very probable that the acid does not exist at all in the free form. There are well-known examples that acids do not exist in free condition, but solely as salts or ether.

This new compound crystallizes in needles or prisms, melting at 126° centigrade. It is insoluble in water, difficultly soluble in ligroine, soluble in methyl-ethyl-alcohol ether, acetic ether, glacial-acetic ether, chloroform, benzole, toluol, and crystallizes from the solutions always in needles or prisms. It is also soluble in diluted acids.

What I claim as new and original, and desire to cover by Letters Patent of the United States of America, is—

A product having the formula $C_{14}H_{24}N_2O_4$ and having the properties of crystallizing in needles or prisms, melting at 126° centigrade, being insoluble in water, difficultly soluble in ligroine, and soluble in ethyl and methyl alcohol ether, acetic ether, glacial-acetic ether, chloroform, benzole, toluol, and diluted acids, as set forth in my specification.

In testimony whereof I have hereunto set my hand in the presence of two subscribing witnesses.

ROBERT GNEHM.

Witnesses:
GEORGE GIFFORD,
CHS. A. RICHTER.